March 10, 1970    G. M. KASSING    3,500,041
APPARATUS FOR INACTIVATING DISEASE ORGANISMS
Filed Feb. 15, 1967
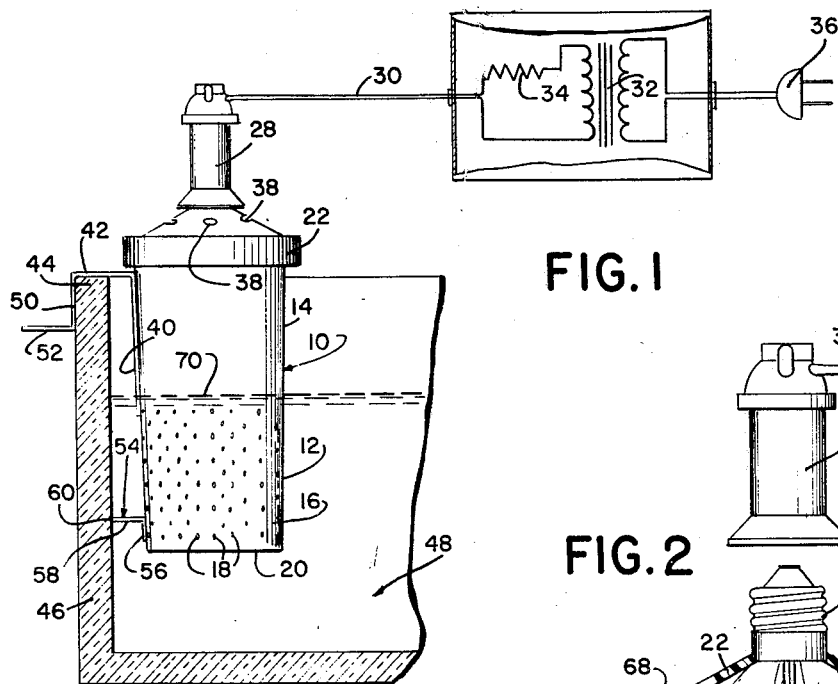
FIG.1
FIG.2
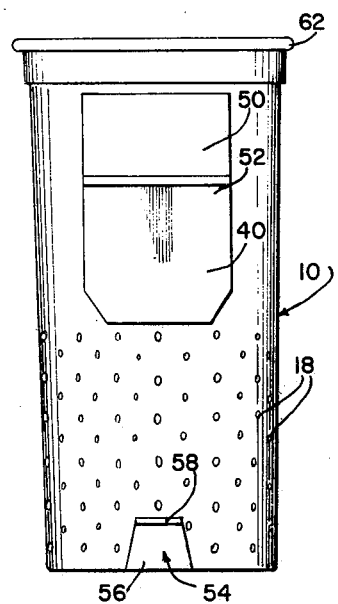
FIG.3
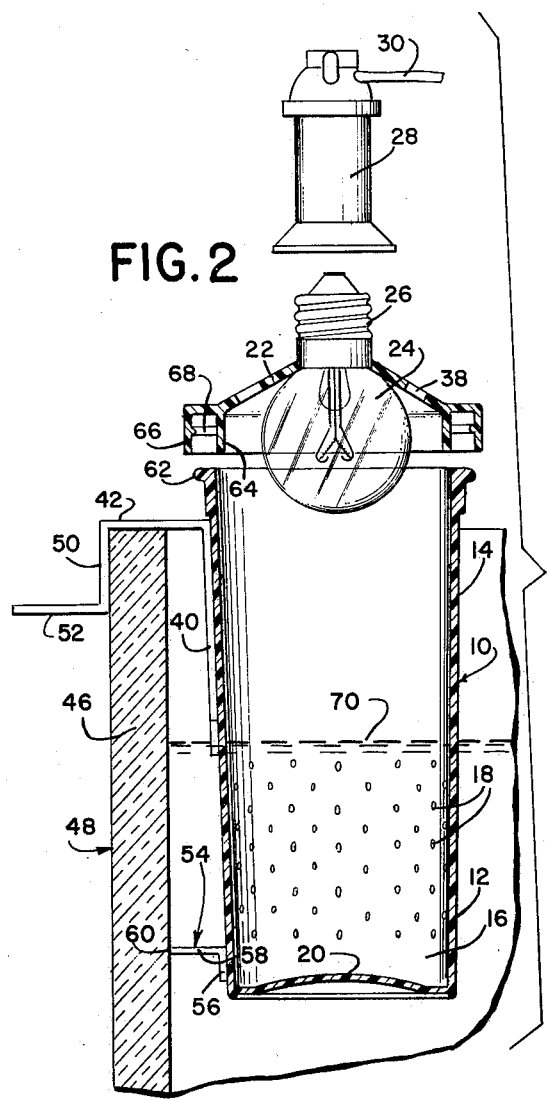
INVENTOR.
GLENN M. KASSING
BY
ATTORNEY

United States Patent Office 3,500,041
Patented Mar. 10, 1970

3,500,041
APPARATUS FOR INACTIVATING DISEASE ORGANISMS
Glenn M. Kassing, 5814 Foley St., Alexandria, Va. 22303
Filed Feb. 15, 1967, Ser. No. 616,376
Int. Cl. G01n 21/26
U.S. Cl. 250—43
9 Claims

ABSTRACT OF THE DISCLOSURE

This invention is concerned with the inactivation of disease organisms in a tank by the use of ultraviolet light, where exposure of the entire contents of the tank to the ultraviolet light is undesirable. In order to treat the liquid in the tank, a housing is provided having a portion having a side wall or walls perforated for the flow of water or other liquid in the tank, with the perforations small enough to exclude fish or other objects in the tank from entering the container and becoming exposed to the ultraviolet light. The ultraviolet light source is contained in the upper portion of the housing and the housing as an entirety is suitably suspended to the desired depth in the tank.

---

This invention relates to apparatus for inactivating disease organisms in tanks employed in the raising and displaying of fish, and is particularly well suited for use with tanks containing tropical fish.

The use of ultraviolet light for water purification is well known, but the exposure of fish to the direct rays of such light for any substantial time is fatal to the fish. Heretofore any feasible use of ultraviolet light for the treatment of water used in the raising of fish has required that the water be withdrawn from the fish tank, treated at a remote location, and then returned to the fish tank.

It is among the objects of the present invention to provide apparatus for inactivating disease organisms in a tank containing live fish immersed in a body of water, comprising a housing composed of material substantially opaque to ultraviolet light, said housing having a closed bottom wall and a side wall defining a lower zone adapted to be submerged below the level of water in the tank, and an upper zone adapted to be positioned above that level, the side wall being perforated in the lower zone for the circulation of water between the tank and housing, a source of ultraviolet light supported in the upper zone of the housing, and means for supporting the housing relative to the tank. The housing is preferably provided with a cover which supports the source of ultraviolet light. The means for supporting the housing preferably includes means for engaging the tank in which it is positioned. The side wall of the housing preferably contains a plurality of perforations in its lower zone. The side wall perforations are preferably located and oriented to preclude the passage therethrough of direct rays from the source into the tank.

A more complete understanding of the invention will follow from a description of the accompanying drawings wherein:

FIG. 1 depicts apparatus according to the present invention in elevation, positioned in a tank, shown as partially broken away, and connected with a transformer-resistor circuit for supplying the source of ultraviolet light;

FIG. 2 is an exploded view of the apparatus, partially in section, positioned in a tank which has been fragmentarily shown; and FIG. 3 is an elevation of the housing portion of the apparatus as it would appear looking from the left of FIGS. 1 or 2.

The housing 10 has a side wall 12 the upper zone 14 of which is imperforate and the lower zone 16 of which contains perforations 18.

The lower end 20 of the housing is closed and its upper end is provided with a cover 22 supporting a source of ultraviolet light 24 having germicidal properties so as to inactivate disease organisms and kill any one-celled plants, such as algae, that enter the container. The threaded base 26 of the light source 24 is received in a socket 28 from which conductors 30 extend to a supply circuit including a transformer 32 and a resistor 34 supplied from a 110 volt, 60 cycle source, for example, upon insertion of the plug 36 into a socket intended therefor.

The cover contains perforations 38 so that any heat generated by the light source can escape.

To the upper portion of the outer wall 12 of the housing 10 there is secured a supporting member having a leg 40 suitably secured to the side wall, the upper end of the leg 40 being bent to define a substantially horizontal leg 42 adapted to rest on the rim 44 of a side wall 46 provided by the tank 48. The horizontal leg terminates in a vertical depending leg 50 engaging the outer wall of the tank and this leg 50 may terminate in a substantially horizontal flange 52.

A stand-off element 54 has a substantially vertical leg 56 suitably secured to the side wall of the housing 10 near its lower end, the leg 56 terminating in a substantially horizontal leg 58 whose end 60 abuts the internal wall of the tank 48 to maintain the housing in a substantially erect position.

The upper end of the housing 10 is provided with an outwardly extending flange 62 for engagement with the cover 22, the cover having an internal wall 64 and an external wall 66 spaced therefrom to define a socket for reception of the flange 62. The outer wall 66 has an internal projection 68 beyond which the flange 62 of the housing 10 will be moved during assembly so as to provide a releasable interlocking engagement between the cover and housing. In order to achieve this interlocking relationship, the outer wall 66 of the cover must be flexible and it is contemplated that the cover be made from a molded plastic composition which is flexible. The housing itself can be composed of a similar flexible plastic composition, but other materials may be employed as well.

With the parts assembled as depicted in FIG. 1, the lower zone of the housing will be immersed below the level 70 of the liquid in the tank and the plug 36 will be inserted in a suitable socket so as to energize the ultraviolet source 24. Liquid within the tank 48 containing live fish or the like, will be in a constant state of agitation sufficient to promote flow through the perforations 18 formed in the lower zone 12 of the housing. Water or other liquid within the housing will be exposed to the direct rays of the source of ultraviolet light so that any disease organisms will be inactivated. The disposition of the perforations 18 will preclude the passage of any direct rays of the ultraviolet light into the tank 48 beyond the confines of the housing 10, so that any fish to be protected will not be exposed to the ultraviolet light and therefore not harmed. Moreover, the perforations 18 are of such size as to preclude the entry of any of the fish to be protected.

Whereas only one embodiment of the invention has been described, various modifications will occur to those skilled in the art and such modifications have been contemplated within the scope of the appended claims.

I claim:
1. Apparatus for inactivating disease organisms in a tank having therein live fish immersed in a body of water, comprising a housing substantially opaque to ultraviolet light, said housing having a closed bottom wall and a side wall defining a lower zone comprising a water treating chamber adapted to be submerged below the level of water in said tank and an upper zone adapted to be positioned above said level, said side wall being perforated in said lower zone for the circulation of water between said tank and said water treating chamber, a source of ultraviolet light supported in the upper zone of said housing, and means for supporting said housing relative to said tank.

2. Apparatus according to claim 1 including a cover for said housing supporting said source.

3. Apparatus according to claim 1 wherein said means for supporting said housing includes means for engaging said tank.

4. Apparatus according to claim 1 wherein said side wall provides a plurality of perforations in said lower zone 5. Apparatus according to claim 1 wherein said side wall provides a plurality of perforations in said lower zone, said perforations being located and oriented with respect to said light source to preclude the passage therethrough of direct rays from said source.

6. Apparatus according to claim 5 wherein said perforations are sufficiently small to preclude the passage of fish from said tank into said housing.

7. Apparatus according to claim 1 wherein said side walls provide a plurality of perforations in said lower zone small enough to preclude the passage of fish therethrough, said light source is substantially wholly disposed in said upper zone, and said perforations and said source are arranged to preclude direct passage of light rays out of said housing.

8. Apparatus according to claim 4 wherein said plurality of perforations comprise a minor part of the surface of said lower zone of said side wall.

9. Apparatus for inactivating disease organisms in a tank having therein live fish immersed in a body of water, comprising a housing substantially opaque to ultraviolet light, said housing having an imperforate bottom wall, a lower side wall portion having at least one opening therein, defining with the bottom wall a water treating chamber in communication with said tank, and adapted to be submerged below the level of water in said tank and an upper side wall portion adapted to be positioned above said level, a source of ultraviolet light within the upper side wall portion, said light source and said at least one opening in said opaque lower side wall being arranged to substantially reduce ultraviolet light emission out of said housing, and means for supporting said housing relative to said tank.

References Cited

UNITED STATES PATENTS 2,669,661    2/1954    Biddiford et al. _____ 250—43
2,709,984    6/1955    Marks _____ 119—3

ARCHIE R. BORCHELT, Primary Examiner

S. C. SHEAR, Assistant Examiner

U.S. Cl. X.R.
21—102; 119—3, 5